United States Patent [19]

Chang et al.

[11] Patent Number: 5,822,409
[45] Date of Patent: Oct. 13, 1998

[54] INCOMING MESSAGE AUTOMATIC REPORTING SYSTEM FOR FAX MACHINES

[75] Inventors: Joseph Chang; Shih-Chin Chang; James Lee, all of Hsin Chu, Taiwan

[73] Assignee: Advanced Scientific Corp., Hsinchu, Taiwan

[21] Appl. No.: 761,512

[22] Filed: Dec. 9, 1996

[51] Int. Cl.⁶ .................................................. H04M 11/00
[52] U.S. Cl. ...................... 379/100.06; 358/440; 358/442
[58] Field of Search ........... 379/100.01, 100.03–100.06, 379/100.12, 100.14, 67, 88, 89; 358/400, 402, 403, 407, 440, 442

[56] References Cited

U.S. PATENT DOCUMENTS

| | | | |
|---|---|---|---|
| 4,654,718 | 3/1987 | Sueyoshi | 379/100.07 |
| 5,127,047 | 6/1992 | Bell et al. | 379/100.06 |
| 5,138,654 | 8/1992 | Yuki | 379/100.06 |
| 5,210,621 | 5/1993 | Kinoshita | 379/100.15 |

*Primary Examiner*—Wing F. Chan

[57] ABSTRACT

An incoming message automatic reporting system installed in the telephone line of a fax machine to automatically notify the addressee after the sender has sent a fax message to the fax machine, the system including a microprocessor, a multi-frequency decoder, a multi-frequency signal generator, a voice IC, a telephone line interface, and three electric connectors, wherein when the sender inputs the code number of a sub-telephone set, the code number is simultaneously stored in the microprocessor, when the sender's fax message is completely received by the addressee's fax machine, the microprocessor picks up the stored code number to dial the sub-telephone set of the addressee, and drives the voice IC to send a voice message to the addressee when the addressee picks up the handset of the sub-telephone set, informing the addressee of the incoming of a fax message.

4 Claims, 6 Drawing Sheets

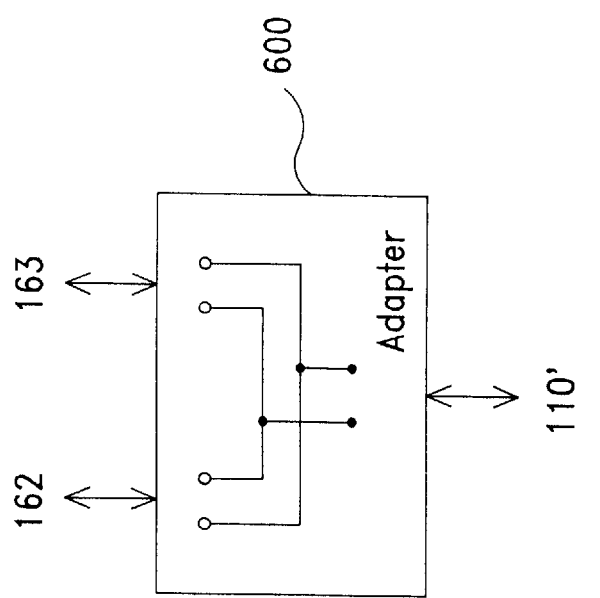

INCOMING MESSAGE AUTOMATIC REPORTING SYSTEM FOR FAX MACHINES

BACKGROUND OF THE INVENTION

The present invention relates to an incoming message automatic reporting system which automatically notifies the addressee of the incoming of a fax machine by voice, when a fax message is received by the addressee's fax machine.

Fax machines have been intensively used in offices as well as families for transmission of graphic matter. The communication between fax machines are confined to a particular agreement. This agreement includes start and end messages, confirmation of paper size and transmission code. When confirmed, fax message is allowed to be transmitted from the sender's fax machine and received by the addressee's fax machine. This confirmation between fax machines is not critical. For certain confidential or important document, the sender may have to dial the addressee to confirm the receipt of the fax message after the fax message has been completely sent out from the sender's fax machine.

SUMMARY OF THE INVENTION

It is the main object of the present invention to provide an incoming message automatic reporting system, which automatically dials the addressee's sub-telephone set and notifies the addressee of the incoming of a fax message by voice, when a fax message is received by the addressee's fax machine.

Because the incoming message automatic reporting system automatically notifies the addressee of the incoming of a fax message when the addressee's fax machine receives a fax message from the sender's fax machine, the sender needs not to dial the addressee again after the dispatch of the fax message.

BRIEF DESCRIPTION OF THE DRAWINGS

FIG. 6 is a circuit diagram of the adapter shown in FIG. 5, showing the connection between the second electric connector and third electric connector, and the telephone line of the public exchange system.

DETAILED DESCRIPTION OF THE PREFERRED EMBODIMENT

Figure 1:
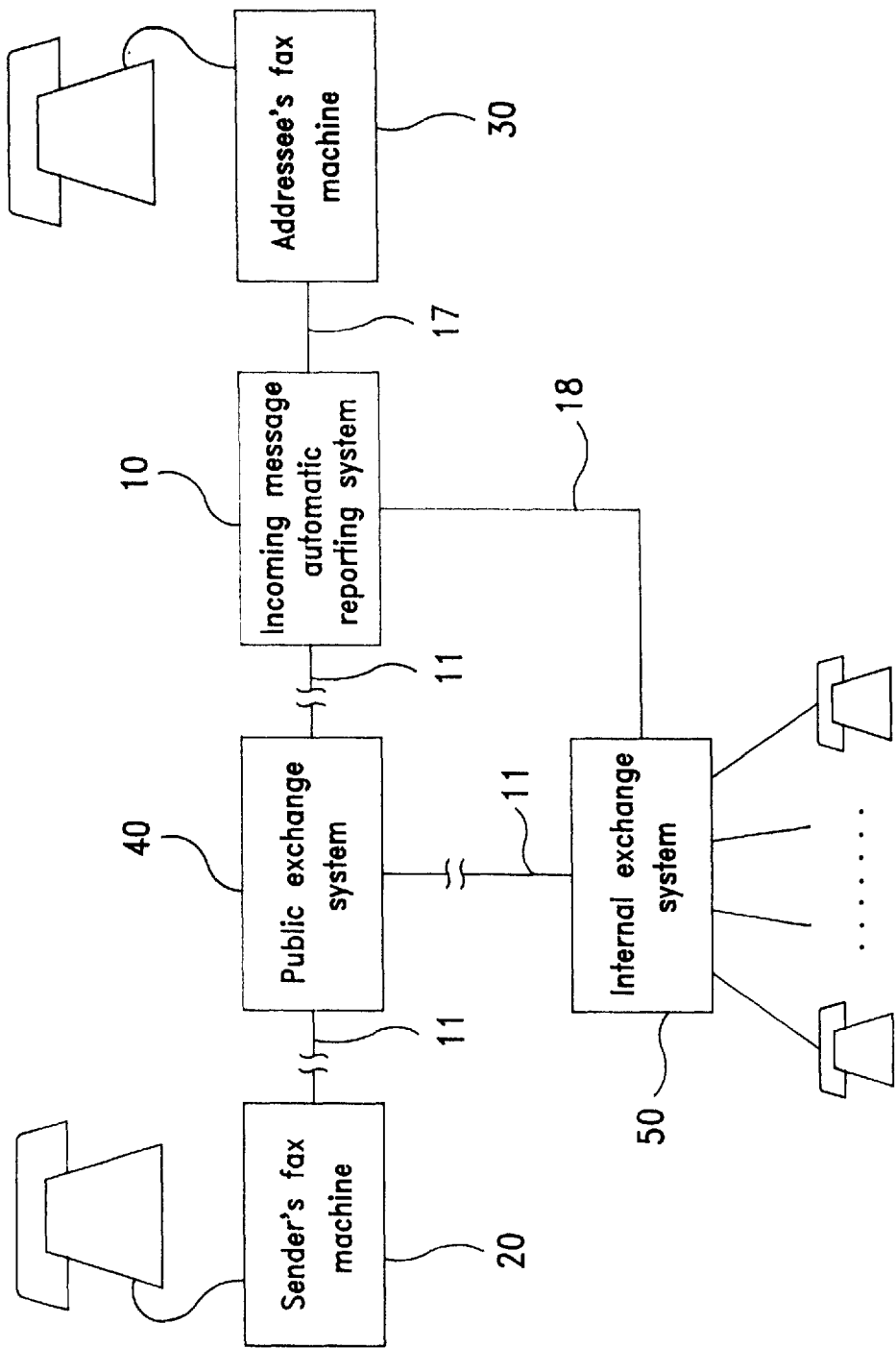
FIG. 1 is a block diagram showing the installation of the present invention in a telephone communication network.
Figure 2:
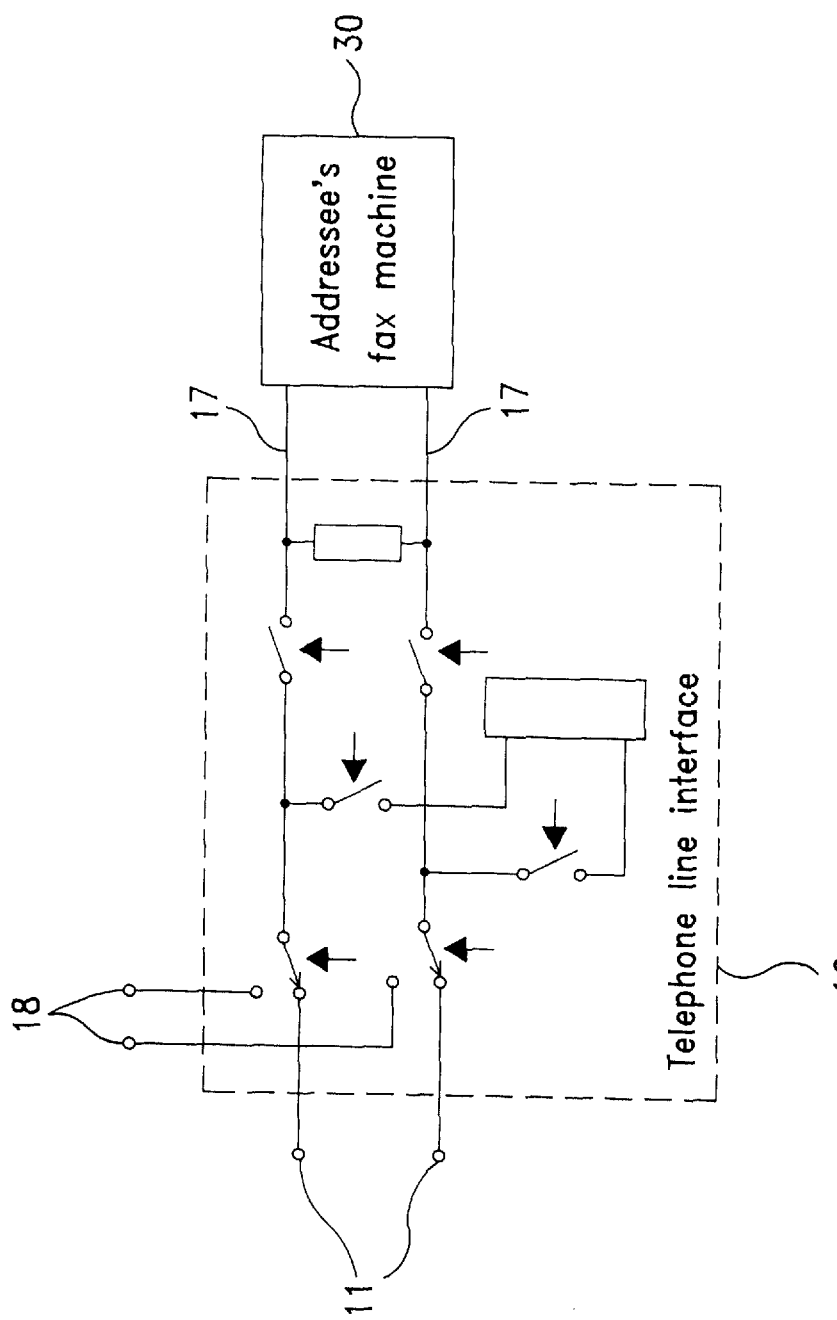
FIG. 2 is a circuit diagram of the present invention, showing the switching of the telephone line interface between the telephone line of the public exchange system and the telephone line of the internal exchange system.
Figure 3:
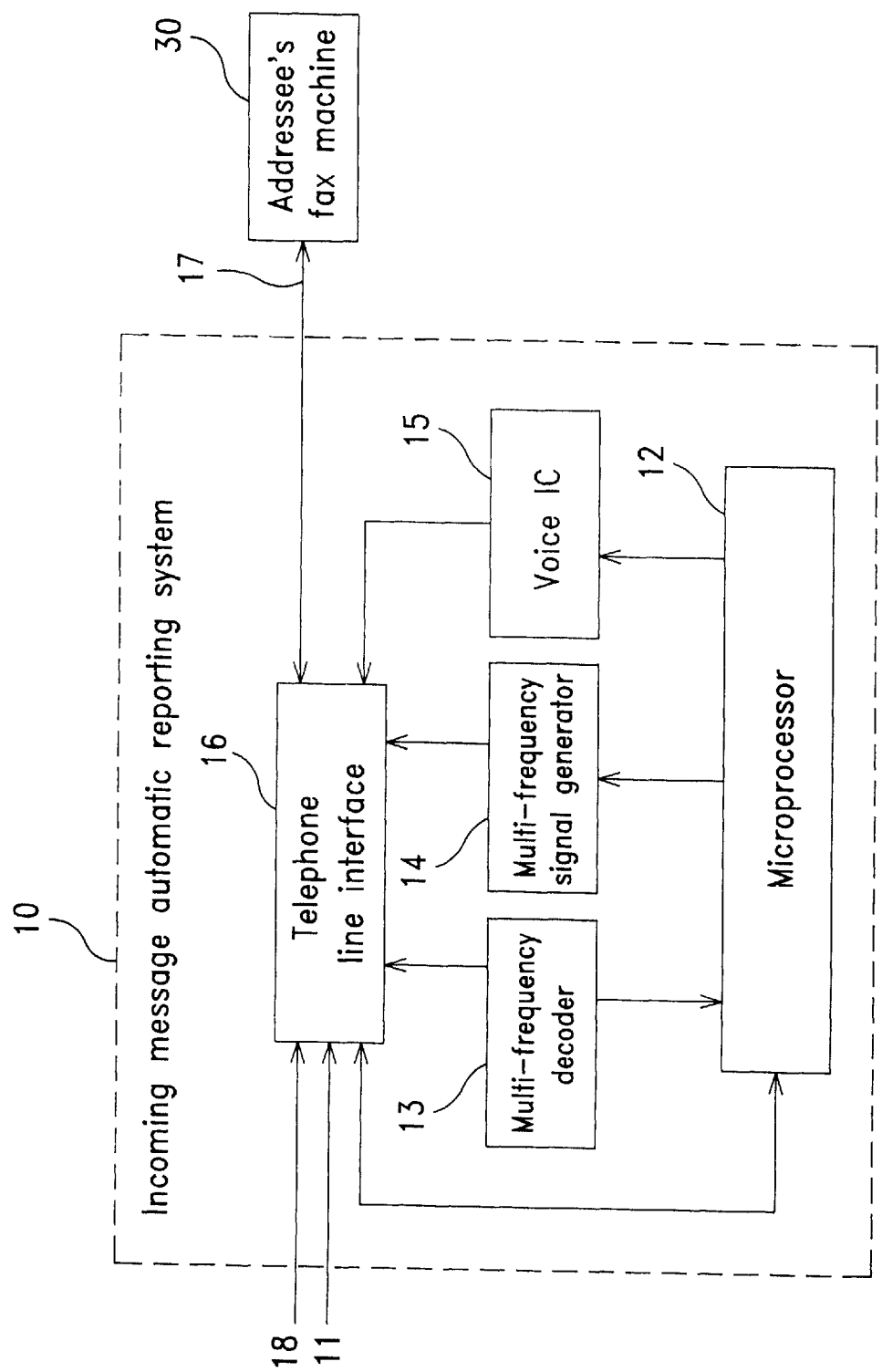
FIG. 3 is a circuit block diagram of the incoming message automatic reporting system of the present invention.

Referring to FIGS. 1, 2, and 3, an incoming message automatic reporting system 10 is installed in the telephone line 11 of an addressee's fax machine 30, to automatically notify the addressee of an incoming message by voice, when a message is sent from a sender's fax machine 20 to the addressee's fax machine 30.

The incoming message automatic reporting system 10 comprises a microprocessor 12, a multi-frequency decoder 13, a multi-frequency signal generator 14, a voice IC 15, and a telephone line interface 16. The microprocessor 12 is a programmable controller for controlling the telephone line interface 16, the multi-frequency decoder 13, the multi-frequency signal generator 14 and the voice IC 15, having a memory for storing the telephone number to be dialed by the sender. The telephone line interface 16 is connected between the telephone line 11 to the public exchange system 40, and the telephone line 17 to the address's fax machine 30, and detects the connection therebetween. The multi-frequency decoder 13 decodes multi-frequency signal from the sender's fax machine 20 into corresponding digital signal, and then sends decoded digital signal to the microprocessor 12. The multi-frequency signal generator 14 converts stored digital signal in the microprocessor 12 into corresponding multi-frequency telephone number signal. The voice IC 15 is controlled by the microprocessor 12 to store the voice message of telling the sender how to input operation procedure, and the voice message of notifying the address about the incoming of a message from the sender's fax machine.

Referring to FIG. 1 again, the incoming message automatic reporting system 10 is connected to the telephone line 11 between the public exchanging system 40 and the addressee's fax machine 30 to monitor the receiving end of the addressee's fax machine 30.

Referring to FIG. 2 again, when the sender dials the telephone number of the addressee's fax machine 30, it is detected by the telephone line interface 16. When the addressee's fax machine 30 is connected, the telephone line interface 16 isolates the addressee's fax machine 30 and the telephone line 11, and then the incoming message automatic reporting system 10 play the announcement message stored in the voice IC 15. The announcement message can be, for example, "xxx company, please input the code number of the designated sub-telephone set and then press the fax button". When the sender receives the announcement message, the code number of the designated sub-telephone set is inputted through the number buttons (the code number of the designated sub-telephone set can also be a subscriber's telephone number). Inputted code signal is then converted by the multi-frequency decoder 13 into corresponding digital signal and then stored in the memory of the microprocessor 12. Then, the microprocessor 12 connects the telephone line 17 of the addressee's fax machine 30 to the telephone line 11 of the public exchanging system 40. When the sender presses the fax button, the sender's message is transmitted to the addressee's fax machine 30. When the sender hangs up the telephone, it is immediately detected by the incoming message automatic reporting system 10. Because the code number of the addressee's sub unit is stored in the memory of the incoming message automatic reporting system 10, the incoming message automatic reporting system 10 connects the telephone line interface 16 to the telephone line 18 of the internal exchange system 50 immediately after the sender presses the fax button, permitting the digital signal of the code number of the sub-telephone set inputted by the sender to be transmitted to the multi-frequency signal generator 14 through the microprocessor 12, so that the digital signal is converted into a corresponding multi-frequency signal and sent to the addressee's sub-telephone set. When the addressee picks up the handset of the sub-telephone set, it is detected by the telephone line interface 16, and the microprocessor 12 drives the voice IC 15 to play a voice message notifying the addressee of the incoming of a message. After notification, the incoming message automatic reporting system 10 immediately returns the telephone line interface 16 to stand-by mode. If the addressee does not pick up the handset, the microprocessor 12 automatically redial the sub-telephone set at a predetermined frequency until the addressee picks up the handset of the sub-telephone set. After notification, the microprocessor 12 of the incoming message automatic reporting system 10 automatically clear the digital signal of the code number of the sub-telephone set from the memory.

Figure 4:
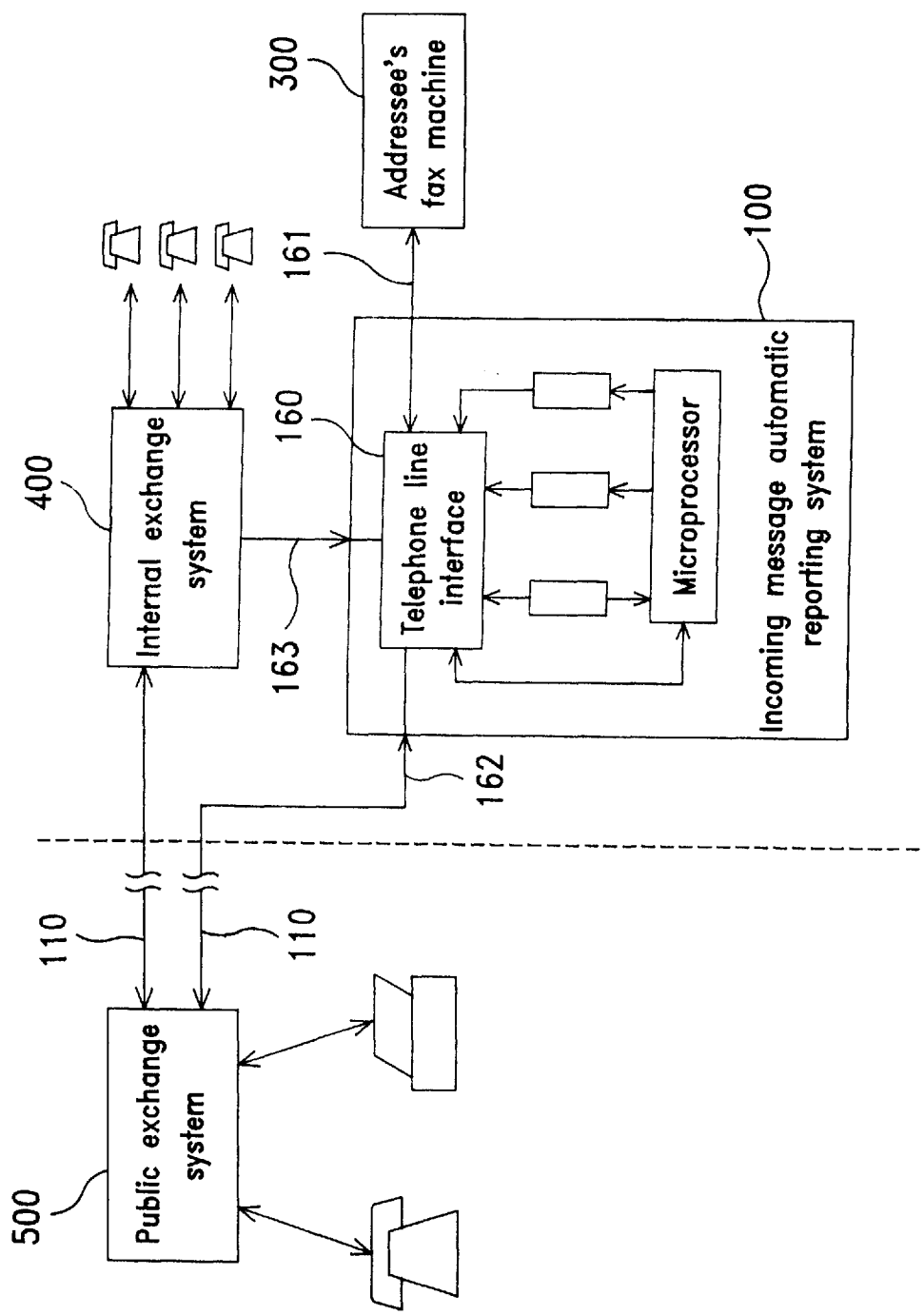
FIG. 4 shows an installation example of the present invention.

FIG. 4 shows an application example of the present invention used in an office, in which the telephone line interface 160 of the incoming message automatic reporting system 100 comprises a first connector 161 connected to the telephone line connector of the addressee's fax machine 300, a second connector 162 connected to the telephone line 110 of the public exchange system 500, and a third connector 163 connected to the internal exchange system 400.

Figure 5:
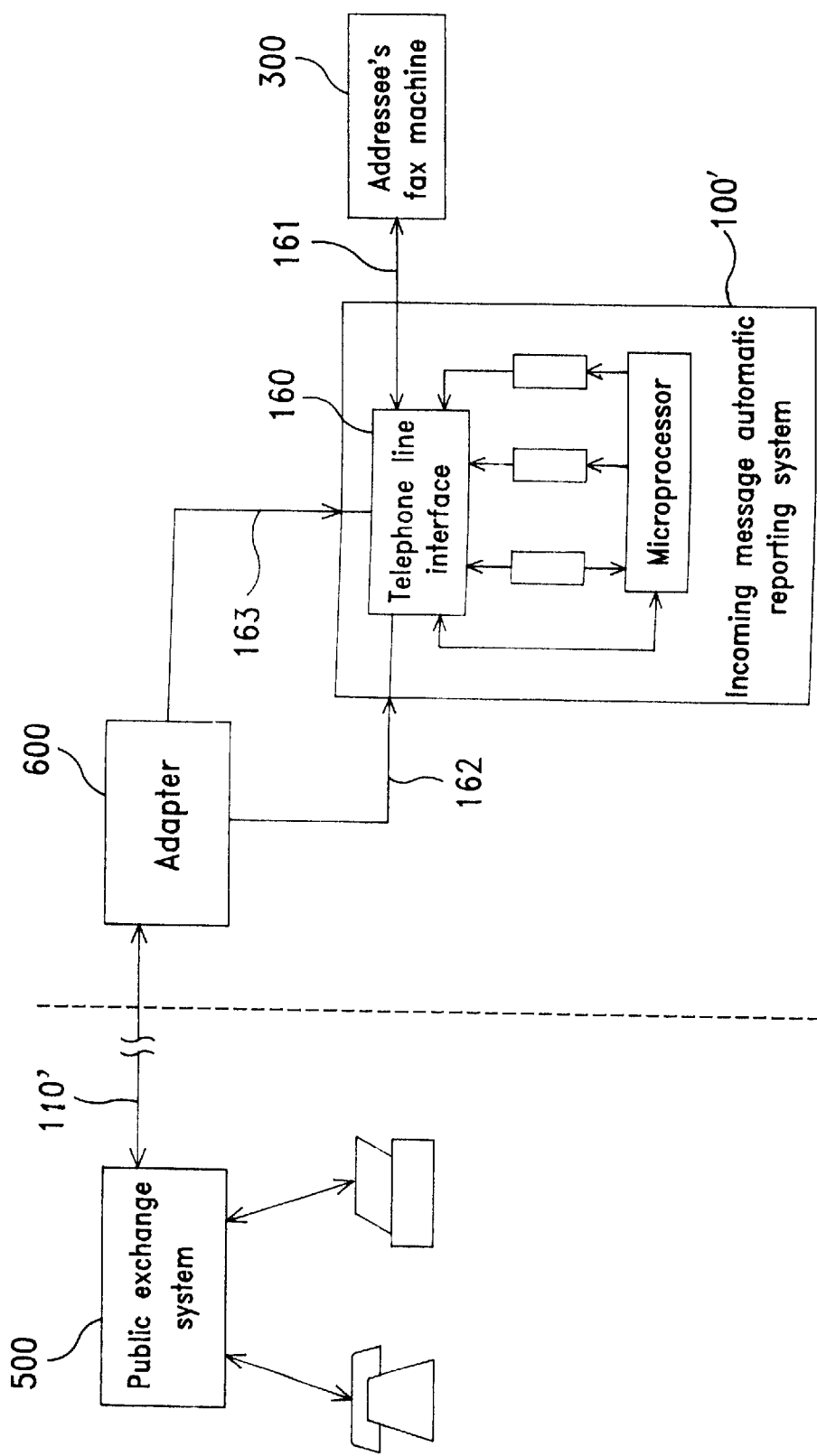
FIG. 5 shows another installation example of the present invention.

FIG. 5 shows another application example of the present invention, in which an adapter 600 is connected between the incoming message automatic reporting system 100' and the telephone line 110' of the public exchange system 500. FIG. 6 is a circuit diagram of the adapter 600, showing the second connector 162 and the third connector 163 connected together to the telephone line 110' of the public exchange system. This arrangement eliminates the aforesaid internal exchange system.

It is to be understood that the drawings are designed for purposes of illustration only, and are not intended as a definition of the limits and scope of the invention disclosed.

What the invention claimed is:

1. An incoming message automatic reporting system installed in a telephone line and connected to a fax machine through an electric connector to automatically notify at least one addressee of the incoming of a fax message, comprising:

a telephone line interface imparting a passage between said telephone line and said fax machine, and detecting the status of the passage;

a multi-frequency decoder adapted for receiving multi-frequency signal inputted by a sender and converting it into corresponding digital signal, said multi-frequency signal being indicative of said at least one addressee's phone number;

a multi-frequency signal generator adapted for converting said digital signal into corresponding multi-frequency signal;

a microprocessor programmable for controlling the operation of said telephone line interface, said multi-frequency decoder and said multi-frequency signal generator, said microprocessor having memory means for storing said digital signal outputted from said multi-frequency decoder;

a voice IC controlled by said microprocessor to store voice messages;

a first electric connector having one end thereof connected to a telephone line connector of said fax machine and an opposite end thereof connected to said telephone line interface;

a second electric connector having one end thereof connected to said telephone line and an opposite end thereof connected to said telephone line interface; and, a third electric connector having one end thereof connected to an internal exchange system and an opposite end thereof connected to said telephone line interface;

said multi-frequency signal indicative of said at least one addressee's phone number being inputted by the sender upon request from said voice IC, decoded by said multi-frequency decoder into said digital signal and stored in said memory means of said microprocessor prior to arrival of the fax message to said fax machine;

said microprocessor outputting said digital signal from said memory means thereof into said multi-frequency signal generator once said fax message has been received by said fax machine, said multi-frequency signal generator converting said digital signal into said corresponding multi-frequency signal;

said corresponding multi-frequency signal being sent to said at least one addressee, and a voice message from said voice IC being sent to said at least one addressee, thereby notifying said at least one addressee of the incoming of said fax message.

2. The incoming message automatic reporting system of claim 1 wherein said second electric connector and said third electric connector are connected together to the public exchange system.

3. The incoming message automatic reporting system of claim 1, wherein said microprocessor outputs said digital signal from said memory means thereof upon termination of communication between the sender and the incoming message automatic reporting system.

4. The incoming message automatic reporting system of claim 1, wherein said microprocessor resets said telephone line interface, once said voice message has been sent to said at least one addressee.

* * * * *